(12) United States Patent
Lund (10) Patent No.: US 10,465,746 B2
(45) Date of Patent: Nov. 5, 2019

(54) VIBRATION TEST FIXTURE

(71) Applicant: TEAM CORPORATION, Burlington, WA (US)

(72) Inventor: Douglas A. Lund, Anacortes, WA (US)

(73) Assignee: Team Corporation, Burlington, WA (US)

( * ) Notice: Subject to any disclaimer, the term of this patent is extended or adjusted under 35 U.S.C. 154(b) by 208 days.

(21) Appl. No.: 15/439,829

(22) Filed: Feb. 22, 2017

(65) Prior Publication Data

US 2018/0238385 A1    Aug. 23, 2018

(51) Int. Cl.
| | |
|---|---|
| *F16C 29/02* | (2006.01) |
| *G01M 7/08* | (2006.01) |
| *G01M 7/02* | (2006.01) |
| *F16C 32/06* | (2006.01) |

(52) U.S. Cl.
CPC ........ *F16C 29/025* (2013.01); *F16C 32/0644* (2013.01); *F16C 32/0655* (2013.01); *F16C 32/0659* (2013.01); *G01M 7/027* (2013.01); *G01M 7/08* (2013.01); *F16C 2370/00* (2013.01)

(58) Field of Classification Search
CPC .................................................. F16C 29/025
USPC ....................................................... 73/12.04
See application file for complete search history.

(56) References Cited

U.S. PATENT DOCUMENTS

| | | | | |
|---|---|---|---|---|
| 3,208,270 | A | * | 9/1965 | Hill .......................... G01M 7/04 408/72 R |
| 4,783,999 | A | | 11/1988 | Kimball |
| 4,996,881 | A | * | 3/1991 | Tauscher ................. G01M 7/04 73/663 |

FOREIGN PATENT DOCUMENTS

| | | |
|---|---|---|
| CN | 202597467 U | 12/2012 |
| CN | 204533204 U | 8/2015 |
| CN | 105443577 A | 3/2016 |

OTHER PUBLICATIONS

International Search Report and Written Opinion issued in parallel PCT Application No. PCT/US18/17985, dated May 4, 2018, 15 pages.

(Continued)

*Primary Examiner* — John Fitzgerald
*Assistant Examiner* — Rodney T Frank
(74) *Attorney, Agent, or Firm* — Lewis Roca Rothgerber Christie LLP (57) ABSTRACT

A T-film bearing for a vibration fixture including a bottom plate, two spaced apart middle plates positioned on the bottom plate, two spaced apart top plates positioned on the middle plates in which the middle plates and the top plates form a T-shaped linear channel for movement of a T-shaped guide member of a slip plate, and oil distribution grooves positioned on a top surface of each of the top plates and the bottom plate defining an independent pressure area, and each groove having a dedicated flow restrictor for supplying lubricating oil to the groove for lubricating reciprocating travel of the guide member within the linear channel and the slip plate on the top plates.

11 Claims, 5 Drawing Sheets

(56) References Cited

OTHER PUBLICATIONS

Team Corporation © brochure entitled "Bearings and Couplings for Vibration Test Systems", 13 pages, available at www.teamcorporation.com.
Team Corporation © brochure entitled "Hydraball", 4 pages, available at www.teamcorporation.com.
Team Corporation © brochure entitled "Pad Bearings", 3 pages, available at www.teamcorporation.com.
Official Letter and Search Report issued in parallel Taiwan Application No. 10710555, dated Dec. 11, 2018, with English translation, 17 pages.

\* cited by examiner

VIBRATION TEST FIXTURE

BACKGROUND ON THE INVENTION

This invention relates to test equipment for simulating vibration and shock loads applied to an article under test, and more particularly, to a vibration test fixture having a linear bearing system with large oil film bearing surfaces for supporting the load of a vibrating test article during single-axis vibration and shock testing.

The vibration test industry has adopted various methods and systems to simulate vibration and shock environments in order to determine product effectiveness and longevity when subjected to these environmental extremes. A parameter important to control in vibration and shock test equipment is the axis of vibration. Certain test equipment will produce single-axis vibration of the article under test, while restraining any cross-axis vibration or motion which is not along the input axis of the vibration source.

Various types of oil film tables, bearings, bearing oil film table combinations, and flexure guidance systems were developed to support the test articles during vibration testing. Early vibration restraint systems included hydrostatic journal bearing slip tables which included a number of drawbacks. To address these drawbacks, Applicant developed a vibration test fixture having a slip plate to which a single-axis reciprocating motion was applied for vibration or shock testing of an article carried on the moving slip plate as disclosed in U.S. Pat. No. 4,996,881. A linear bearing supports the load of the slip plate and the test object during reciprocating motion of the slip plate. The linear bearing has a generally planar, two-dimensional bearing surface for supporting the load while restraining cross-axis motion laterally and vertically with respect to the axis of motion. The entire load-supporting two-dimensional bearing surface area is lubricated with a thin film of oil, and the areas of multiple-axis restraint within the bearing also are lubricated with a thin film of oil during single-axis reciprocating motion of the slip plate. The linear bearing system provided a means of bearing support for the entire load of the slip plate and the test article on a constantly lubricated flat bearing surface during single-axis vibration, while also providing a constantly lubricated multiple-axis restraint means for the moving slip plate during testing.

The bearing system included an inverted T-shaped bearing guide member for mounting the slip plate for single-axis travel relative to the linear bearing support surface. The inverted T-shaped bearing guide member, combined with the oil film slip surfaces, provides a load capacity which exceeds the capacity of a standard high pressure journal bearing slip table system. The bearing system provided four oil ports on the top surface of the top plate to supply the oil for the T-film bearing. Such a design provided for a limited load capacity and tolerance for non-uniform external loads on the slip table. This design had an additional drawback in that deformation was created by temperature changes and temperature gradients which was a common condition when such T-film bearings were used with slip tables that were operated with thermal chambers. Consequently, a need exists for an improved vibration test fixture incorporating a T-film bearing in combination with a slip plate which addresses the drawbacks associated with prior designs.

SUMMARY OF THE INVENTION

The present invention is directed to a vibration test fixture having a slip plate to which a single-axis reciprocating motion is applied for vibration or shock testing of an article carried on the moving slip plate. A linear bearing supports the load of the slip plate and the article under test during reciprocating motion of the slip plate. The linear bearing has a generally planar, two-dimensional bearing surface for supporting the load while restraining cross-axis motion laterally and vertically with respect to the axis of motion. The entire load-supporting two-dimensional bearing surface area is lubricated with a thin film of oil, and the areas of multiple-axis restraint within the bearing are also lubricated with a thin film of oil during single-axis reciprocating motion of the slip plate. The linear bearing system thereby provides a means of bearing support for the entire load of the slip plate in the article under test under test on a constantly lubricated flat bearing surface during single-axis vibration, while also providing a constantly lubricated multi-axis restraint means for the moving slip plate during testing.

In an embodiment of the invention, the bearing system includes an inverted T-shaped bearing guide member for mounting the slip plate for single-axis travel relative to the linear bearing support surface. The bearing system incorporates oil distribution grooves that define pressure areas on the same surface instead of round ports used in prior systems. The size, shape and location of the oil distribution grooves and the associated pressure areas created increases the effective load carrying capacity of the test fixture. Incorporation of oil distribution grooves also increases the ability of the bearing to resist off-center loads created by external temperature changes or other factors. Each oil distribution groove is fed by a dedicated flow restrictor which allows each individual pressure area surrounded by the groove to resist external loads independently of any of the other grooves located on a surface. The flow restrictors are mounted adjacent each oil distribution groove by the use of removable fittings which hold each flow restrictor. Minimizing the trapped volume of fluid between the flow restrictor and the oil distribution groove improves the ability of the bearing to resist rapidly changing external loads. These and other aspects of the invention will be more readily understood by reference to the following detailed description and accompanying drawings.

DETAILED DESCRIPTION

Figure 1:
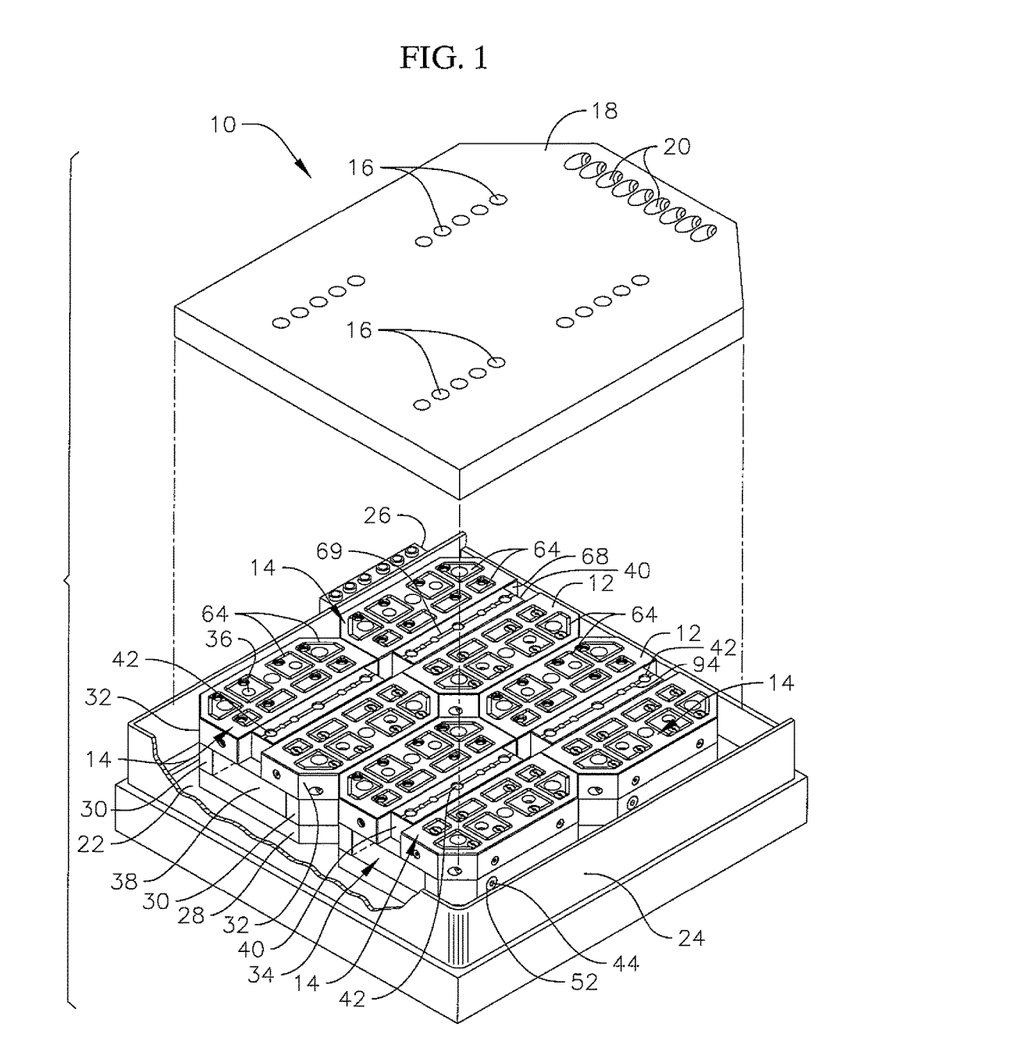
FIG. 1 is an exploded perspective view illustrating components of a vibration test fixture according to principles of this invention.

FIG. 1 illustrates components of a vibration test fixture according to principles of this invention. The fixture includes a rigid and generally planar slip plate 10 mounted for reciprocating linear travel on flat upper bearing surfaces 12 of a system of multiple linear support bearings 14. The slip plate is of generally uniform thickness and has a generally rectangular nominal surface area within a region of its bottom surface that is supported for linear travel on the upper bearing surfaces 12.

Separate groups of longitudinally spaced apart holes 16 extend through the slip plate. FIG. 1 illustrates two groups of five holes being aligned on a first axis, which defines an axis of travel of the slip plate; and two separate groups of five holes are aligned on a second axis parallel to the group of holes on the first axis. These groups of holes provide a means for receiving fasteners for rigidly securing the slip plate to a bearing guide member for guiding single-axis travel of the slip plate on the bearing surfaces 12.

One end portion 18 of the slip plate projects away from the bearing-supported surface portion of the slip plate. A row of equidistantly spaced apart holes 20 extend angularly through the end portion 18 of the slip plate. These holes receive fasteners (not shown) for rigidly securing the slip plate to a means (not shown) for applying a reciprocating linear force to the slip plate for shock and vibration testing of an article (not shown) affixed to the upper surface of the slip plate.

FIG. 1 illustrates one embodiment of the test fixture in which four separate bearings 14 are mounted in side-by-side pairs to support the slip plate for its reciprocating travel on the bearing surfaces 12. The bearings 14, are rigidly affixed to the upper surface of a steel base plate 22. An upright outer wall 24 extends around the outer perimeter of the base plate 22, to provide a means of retaining lubricating oil contained within the fixture. A manifold 26 mounted on one edge of the base plate provides for filtration and recirculation of the lubricating oil through the bearings 14.

Each bearing 14 is preferably a three layer structure having a generally rectangular bottom plate 28; a pair of laterally spaced apart, long and narrow, generally rectangular middle plates 30 extending parallel to one another along opposite sides of the bottom plate; and a pair of laterally spaced apart, generally rectangular top plates 32 extending parallel to one another along opposite sides of the middle plates. The narrow middle plates form a wide, shallow bottom portion of an inverted T-shaped channel or groove 34 extending along the central axis of each bearing. The top plates are wider than the middle plates and are spaced apart by a narrow gap which forms the narrow portion of the T-shaped channel in each bearing. The flat upper bearing surfaces 12 are formed by the tops of the top plate 32. The bearing surfaces 12 of the top plate are machined with extreme accuracy so as to lie in a common flat plane to provide bearing support for the bottom of the slip plate 10.

In the illustrated embodiment, the side walls of the adjacent pairs of bearings 14 abut against one another, and the end walls of bearing pairs aligned along a common axis defined by the T-shaped groove also abut against one another. This produces a generally flat and continuous upper bearing surface occupying a large portion of the nominal bearing support surface area within the fixture.

Separate series of axially-aligned and uniformly spaced apart holes 36 extend through the upper plates 32. These holes are aligned with holes in the middle plates 30 and in the bottom plates 28. Fasteners extend through the holes 36 for rigidly securing each bearing 14 to the lower plate 22 of the fixture.

The slip plate 10 is mounted for guided single-axis travel relative to the bearings 14 by separate inverted T-shaped guide members rigidly affixed to the bottom of the slip plate. Separate guide members are slidably engaged in corresponding T-shaped channels 34 in the bearings for guiding the slip plate during use. Each guide member is a two-component structure which includes a relatively wide lower guide member bearing block 38 of generally rectangular configuration which slides in the wide bottom portion of the T-shaped channel, and a relatively narrow upper guide member bearing block 40 of rectangular configuration which slides in the narrow upper portion of the T-shaped groove 34 during use. Each upper bearing block 40 is affixed to a corresponding lower bearing block 38 and is also rigidly affixed to the bottom of the slip plate. The bearing guides provide a means for guiding single-axis travel of the slip plate along the side-by-side pairs of aligned T-shaped channels 34 in the bearings 14. Separate series of holes 42 extend through each of the upper bearing block 40 and are aligned with corresponding holes 43 shown in FIG. 2 in the lower bearing blocks to provide means for receiving threaded fasteners for rigidly affixing the T-shaped bearing guides to the bottom of the slip plate.

Figure 2:
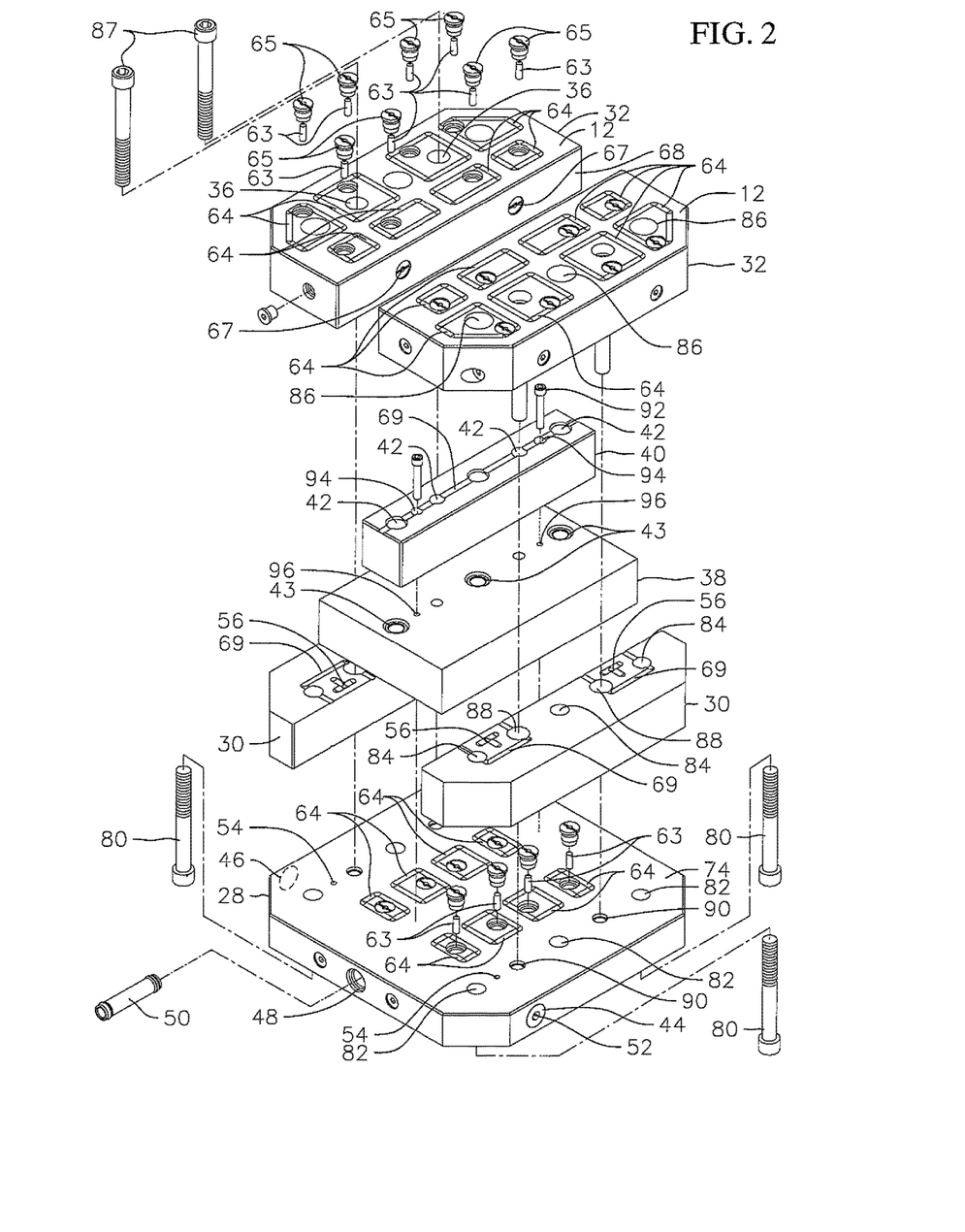
FIG. 2 is a top exploded perspective view illustrating detailed construction of the linear bearing and slip guide assembly.
Figure 3:
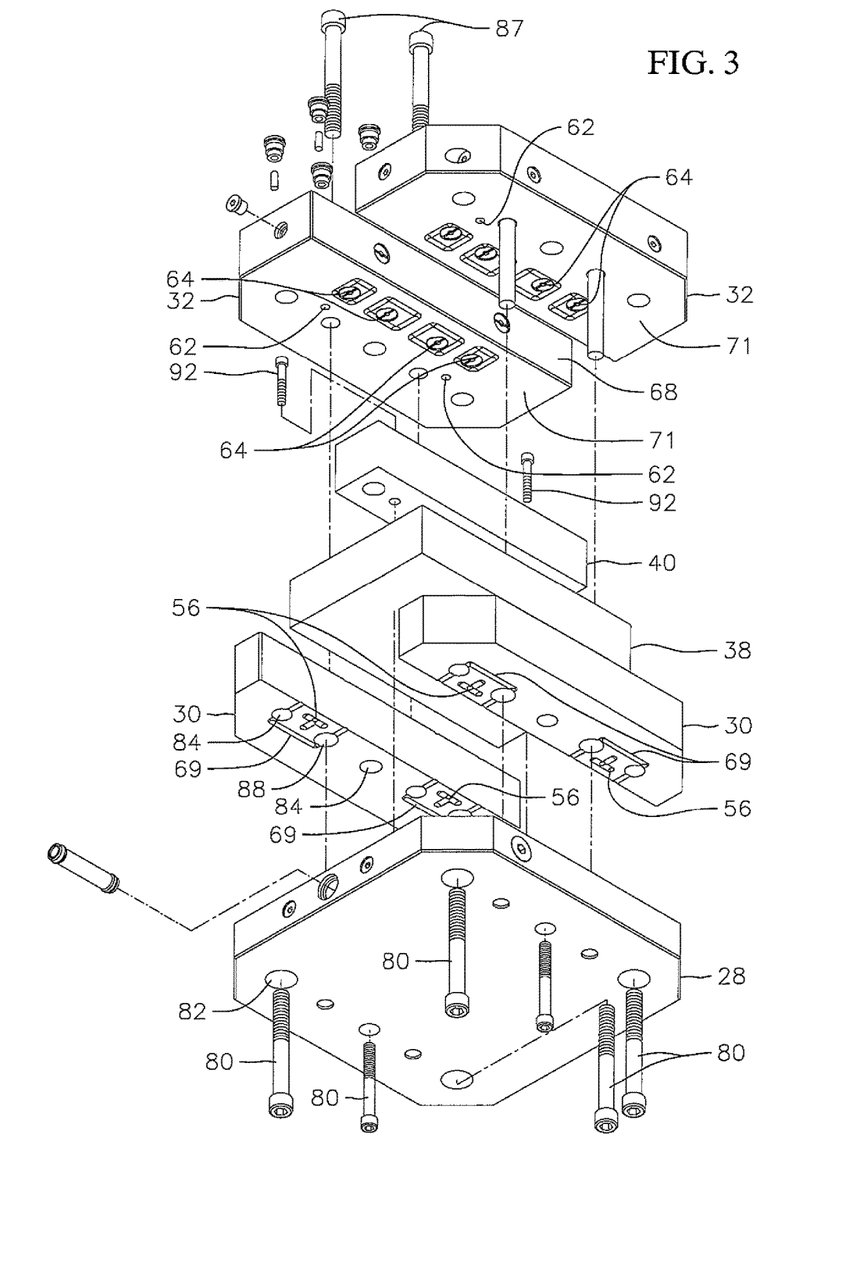
FIG. 3 is a bottom exploded perspective view of FIG. 2.
Figure 4:
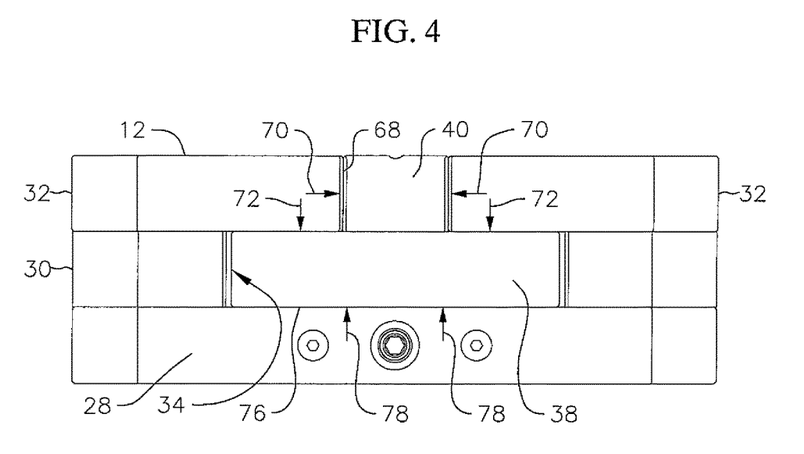
FIG. 4 is an end elevation view of FIG. 2.
Figure 5:
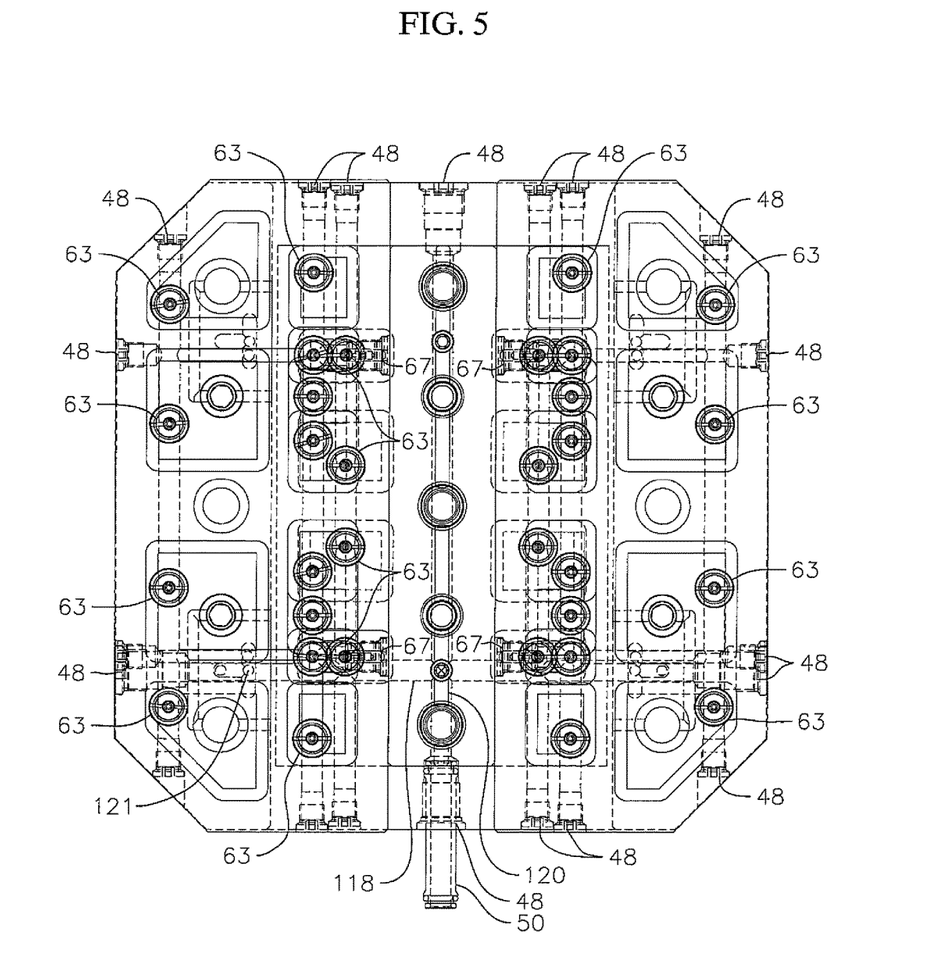
FIG. 5 is a top plan view of FIG. 2 illustrating the oil distribution conduits.
Figure 6:
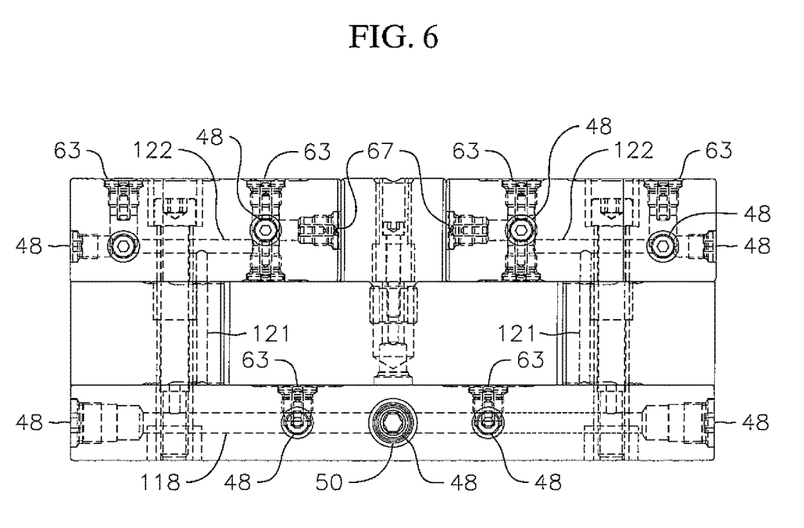
FIG. 6 is an end elevation view of FIG. 5.

Now referring to FIGS. 2-4 the bottom plate 28 has an oil flow port 44 opening through one side and has a similar oil flow port 46 opening through the opposite side wall of the base plate. An oil flow port 48 opens through one end wall of the bottom plate, and a similar oil flow port (not shown) opens through the opposite end wall of the bottom plate. Oil flow port 48 serves as an oil inlet port and includes an oil pressure connector 50 which is positioned within the oil inlet passage. This oil pressure connector can control oil flow from the manifold through the inlet port and then to a main oil galley (not shown) within the bottom plate. A hex plug 52 can be used to block oil flow from oil flow ports as necessary. If the base plate 28 is positioned adjacent to an identical bearing either to its side or adjacent to one of its ends, or both, oil flow from the manifold passes through the bottom plate and then into one or more of the adjacent base plates. In this instance the hex plug or plugs are replaced with one or more of the pressure connectors 50 to control oil flow from the bottom plate to an adjacent bottom plate. Oil flow within the bottom plate 28 then passes from the bottom plate laterally through one or more of the side ports 44 or 46, or endwise through one of the end ports 48 into similar oil inlet ports in the bottom plates of adjacent bearings positioned adjacent to either side or either end of the base plate as shown in more detail in FIGS. 5 and 6 and to be discussed in more detail subsequently herein.

Referring to FIGS. 2 and 3 lubricating oil passes into the inlet ports 44, 48 and then through vertical oil passages 54 leading from the bottom plate 28 into corresponding vertical oil passages 56 in the middle plates 30. Lubricating oil passing through the middle plates then passes through corresponding sealed vertical oil passages 62 in the top plates 32. Internal oil supply lines within the top plates feeds the lubricating oil to sixteen oil distribution grooves 64 on the top surface 12 of the top plates 32 (eight grooves on each top plate) that each define a pressure area between the top plates and the slip plate. The size, shape and location of the oil distribution grooves 64 and the associated pressure areas increases the effective load carrying capacity of the test fixture.

Effective shapes for individual oil distribution groove boundaries include an overall length and width dimension that are approximately equal. Shapes can include circular, square, triangular, hexagonal, octagonal or any polygon shape having approximately equal lengths on each side. This is particularly useful when the external load distribution of the objects being tested is not precisely known.

The arrangement of oil distribution grooves also increases the ability of the bearing to resist off-center loads created by external temperature changes or other factors. Increasing the quantity of pressure pockets created by individual oil distribution grooves in any given area increases the ability of the hydrostatic bearing to resist local loads that are not uniformly distributed across the entire working surface. The size of the oil distribution grooves should be approximately equal and uniformly distributed over the surface in order to maximize the asymmetrical load carrying capability of the complete hydrostatic bearing.

Each oil distribution groove is fed by a dedicated flow restrictor 63 which allows each individual pressure area surrounded by the groove to resist external loads independently of any of the other sixteen grooves on the top surface 12 of the top plates. The flow restrictors 63 are mounted very close to each oil distribution groove by the use of a removable fitting 65 that holds each flow restrictor in place. Minimizing the trapped volume of oil between the flow restrictor and the oil distribution groove improves the ability of the bearing to resist rapidly changing external loads.

Oil outlet ports 67 in the inside walls 68 of the top plates feed lubricating oil to the sides of the narrow upper bearing blocks 40 which slide in the narrow portions of the T-shaped channels 34 as represented by arrows 70 in FIG. 4. Oil distribution grooves 64 are positioned along the bottom wall surfaces 71 of the top plates to feed lubricating oil to the upper wall portions of the lower guide member bearing block 38 as represented by arrows 72 in FIG. 4.

Separately lubricating oil flowing through flow restrictors 63 in the bottom plate 28 feeds oil to oil distribution grooves 64 positioned in an upper surface 74 of the bottom plate to lubricate a bottom wall 76 of the lower bearing block 38 on the slip plate guide bearing, as represented by the arrow 78 in FIG. 4. FIG. 2 illustrates eight oil distribution grooves on upper surface 74 of bottom plate 28. Thus, oil under pressure is supplied to the interface between all surfaces of the T-shaped guide member in the T-shaped guide channel, as well as to all load bearing upper surfaces 12 of the bearings. The upper and lower surfaces of the middle blocks as well as the upper surface of the narrow upper bearing block 40 includes oil distribution grooves 69 for the distribution of oil to restrictors that in turn deliver oil to the oil distribution grooves on the load carrying surfaces of the top and bottom plates of the bearing.

The bearing components are fastened together as a rigid unit by bolts 80 extending upwardly through countersunk bores 82 in the baseplate 28 and through aligned bores 84 in the middle plates 30 and are threaded into bores 86 in the top plate 32 to hold the bottom plate, middle and upper plates together as a rigid unit. Similarly, bolts 87 extend downwardly through the bores 36 in the top plates, through bores 88 in the middle plates 30, through bores 90 in the bottom plate 28 and into threaded bores (not shown) in the base of the fixture for bolting the three-layer bearing components to the fixture as a rigid unit.

Bolts 92 extend downwardly through bores 94 in the narrow upper bearing block 40 of the bearing guide and into threaded holes 96 in the wide lower bearing block 38 of the bearing guide to hold the blocks 40 and 38 together as a rigid inverted T-shaped unit. This rigid unit is then affixed to the bottom portion of the slip plate 10 with fasteners threaded through holes 42 in the block 40.

As indicated in FIG. 1 the manifold 26 is mounted to the side of the main base plate 22 by fasteners. An inlet oil pressure hose delivers oil from an oil supply to the manifold for distribution and filtering prior to feeding the oil from the manifold into the bottom plates 28, initially through the pressure connector 50 in the inlet port 48 as seen best in FIGS. 5 and 6. Internal horizontal passageways 118 and 120 deliver oil to the dedicated flow restrictors 63 for the oil distribution channels 64 and vertical passageways 121 deliver oil through the middle plates to the top plates. Passageways 122 in the top plates deliver oil to the dedicated flow restrictors 63 for the oil distribution channels 64 positioned in the top plates 32. Additional inlet ports 48 are positioned around the end surfaces of the bottom plate and top plates which can be used for either the introduction or removal of oil from the plates as necessary or as test ports. This provides a means for circulating the oil under pressure from the manifold through the fixture and for returning the oil through a return hose to the primary oil supply. An oil collector provides a rectangular outer peripheral wall 24 for containing the oil supply in a mote surrounding the bearings.

As is known, an article under test is rigidly affixed to the top surface of the slip plate by fasteners engaged in a grid pattern of inserts (not shown) in the top of the slip plate. In use, the article under test is subjected to vibration when carried by the vibrating slip table. The slip table is guided for single-axis longitudinal reciprocating travel along the T-shaped channels. The T-shaped guide members slide in their respective channels for guiding back and forth travel of the slip plate on the bearing surfaces 12 of the upper plates 32. Lubricating oil is supplied to the upper bearing surfaces 12 so that the load of the slip plate and the article under test is supported by the lubricated upper linear bearing surface. The load of the slip plate and the article under test is supported in part by the upper surface portion of the bottom bearing plate 28, where the lower bearing block 38 slides back and forth on the bottom plate. This interface between the bottom of the bearing guide and the upper surface of the bottom plate is 100% lubricated by the circulating lubricating oil.

During its vibration, the slip plate is restrained from cross-axis motion, both laterally with respect to its axis of travel, and vertically with respect to the load bearing surfaces of the bearings. The inverted T-shaped bearing guide sliding in the inverted T-shaped channel provides this multiple axis means of restraint.

Increased size, shape and quantity of oil distribution grooves on the top surface of the top plate, the bottom surface of the top plate and the top surface of the bottom plate produces large effective independent pressure areas resulting in increases in the static and dynamic load capacity of the test fixture. The pressure in the grooves on the surfaces react to external loads thereby being able to change with changing loads. Positioning of a flow restrictor adjacent each oil distribution groove increases the oil flow rate and thereby increases the capacity to carry away heat that might be absorbed from a temperature chamber above the slip table. Heat management provides for reliable slip table operation. Location of the individual flow restrictors very close to its respective oil distribution groove reduces the trapped volume of fluid between the restrictor and the groove and therefore increases the dynamic load capacity of the test fixture.

Further improvements of an embodiment of the invention can include an increased bore size 36 through the top plate which provides for larger mounting bolts 87 to increase the load capacity of the test fixture. In addition an increase in the thickness of the lower bearing block 38 and the top plate 32 increases the stiffness and reduces deflection under load of the bearing to increase load capacity of the fixture. Middle plates 30 can also have a corresponding increase in thickness to achieve better results during vibration testing.

Although the present invention has been described and illustrated with respect to an embodiment thereof, it is to be understood that changes and modifications can be made which are in the full intended scope of the invention as hereinafter claimed.

What is claimed is:

1. A vibration test fixture having a slip plate adapted for carrying an article affixed thereto and having applied thereto a reciprocating sliding motion for use in shock or vibration testing of the article, comprising: hydrostatic bearing means affixed in a stationary position for supporting the slip plate for reciprocating sliding travel on the bearing means during testing, the bearing means having a generally planar, two-dimensional flat bearing surface to support a generally planar, two-dimensional lower surface of the moving slip plate; an elongated single axis guide member of generally T-shaped cross section for connection to the slip plate, the guide member extending away from the lower surface of the slip plate for sliding connection to a corresponding linear channel of generally T-shaped cross section in the bearing means for guiding said reciprocating sliding travel of the slip plate along a longitudinal axis of travel on said bearing surface, said sliding connection of the guide member to the linear channel including means for restraining lateral movement of the slip plate relative to the longitudinal axis of travel of the slip plate, and means for restraining vertical movement of said slip plate relative to the bearing surface during longitudinal travel of the slip plate; and a plurality of oil distribution grooves extending into the flat bearing surface of the hydrostatic bearing means, each groove defining an independent pressure area for the vibration test fixture and each groove having a dedicated flow restrictor for supplying lubricating oil to the groove for lubricating the reciprocating longitudinal travel of the slip plate on the bearing surface.

2. The fixture of claim 1 wherein each dedicated flow restrictor is mounted adjacent the oil distribution groove by a removable fitting.

3. The fixture of claim 1 wherein there are sixteen oil distribution grooves on the bearing surface for each guide member.

4. The fixture of claim 1 wherein the hydrostatic bearing means comprises:
a bottom plate;
two spaced apart middle plates positioned on the bottom plate; and
two spaced apart top plates positioned on the middle plates,
wherein the middle plates and the top plates form the linear channel.

5. The fixture of claim 4 wherein the oil distribution grooves are located on a top surface of each of the top plates, middle plates and the bottom plate.

6. The fixture of claim 5 wherein oil distribution grooves are also located on a bottom surface of the top plates.

7. The fixture of claim 4 wherein the top plates have at least one flow restrictor in a side surface for directing oil into the linear channel.

8. The fixture of claim 1 including a base plate to which the bearing means are rigidly affixed, and further including means for circulating the lubricating oil through the base plate to the bearing surface and to the lateral and vertical restraining means.

9. The fixture of claim 1 wherein the single-axis guide member comprises an inverted T-shaped guide carried on the slip table and movable with respect to a corresponding inverted T-shaped channel in the bearing means, and in which a portion of said bearing surface is at the bottom of the inverted T-shaped channel in the bearing means.

10. The fixture of claim 9 including at least a pair of the bearing means mounted side-by-side in the fixture, thereby providing guided travel of the slip plate along first and second longitudinal axes in a pair of parallel inverted T-shaped channels, with corresponding pairs of inverted T-shaped guides movable in the respective channels.

11. The fixture of claim 1 in which the fixture includes multiple bearing means mounted adjacent one another to provide continuous two-dimensional bearing surfaces across the adjacent bearing means to support the slip plate, and including means for supplying said oil to the bearing and bearing restraint surfaces of the multiple bearings means through a common oil pressure system.

* * * * *